United States Patent
Park et al.

(10) Patent No.: US 7,574,505 B2
(45) Date of Patent: Aug. 11, 2009

(54) HOME SERVER CAPABLE OF IMPLEMENTING ENERGY-SAVING AND SERVICE CONVERGENCE AND METHOD FOR CONTROLLING THE SAME

(75) Inventors: Wan Ki Park, Daejeon (KR); Chang Sic Choi, Daejeon (KR); Young Woo Choi, Daejeon (KR); Youn Kwae Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 450 days.

(21) Appl. No.: 11/634,615

(22) Filed: Dec. 6, 2006

(65) Prior Publication Data
US 2007/0130280 A1  Jun. 7, 2007

(30) Foreign Application Priority Data
Dec. 7, 2005  (KR) ............... 10-2005-0119125
Feb. 15, 2006  (KR) ............... 10-2006-0014833

(51) Int. Cl.
*G06F 15/173* (2006.01)
(52) U.S. Cl. ............ 709/224; 709/208; 713/310; 713/323; 713/324
(58) Field of Classification Search ........... 709/208, 709/223, 224; 713/300, 310, 320, 323, 324
See application file for complete search history.

(56) References Cited

U.S. PATENT DOCUMENTS

| | | | | |
|---|---|---|---|---|
| 3,889,195 | A * | 6/1975 | Elshuber | 455/179.1 |
| 5,617,571 | A * | 4/1997 | Tanaka | 713/324 |
| 7,073,077 | B1 * | 7/2006 | Gavlik | 713/300 |
| 7,243,151 | B2 * | 7/2007 | Sekiguchi | 709/227 |
| 7,260,729 | B2 * | 8/2007 | Araki | 713/300 |
| 2002/0156899 | A1 * | 10/2002 | Sekiguchi | 709/227 |
| 2004/0019813 | A1 * | 1/2004 | Kobayashi | 713/300 |
| 2004/0158748 | A1 * | 8/2004 | Ishibashi et al. | 713/300 |
| 2004/0254683 | A1 * | 12/2004 | Kim | 700/286 |

(Continued)

FOREIGN PATENT DOCUMENTS

KR  1020010055158  7/2001

(Continued)

OTHER PUBLICATIONS

Barroso et al, "The Case for Energy-Proportional Computing", Computer, vol. 40, Issue 12, Dec. 07, pp. 33-37.*

(Continued)

*Primary Examiner*—Oanh Duong
(74) *Attorney, Agent, or Firm*—Ladas & Parry LLP (57) ABSTRACT

A home server for service convergence and energy-saving, and a method for controlling the same are disclosed to provide broadcast services, Internet services, game platform services, and a broadband network distribution function required by each home network. The home server includes a broadcast processor, a service, a network distribution, a power-supply unit for providing a power-supply signal to each module of the home server, and a power-supply controller. The power-supply controller controls on/off operations of the power-supply signal transmitted from the power-supply unit to each module of the home server according to services and operation states of the service processor and the network distribution unit.

18 Claims, 4 Drawing Sheets

U.S. PATENT DOCUMENTS

| | | |
|---|---|---|
| 2006/0142900 A1* | 6/2006 | Rothman et al. ............ 700/295 |
| 2006/0155395 A1* | 7/2006 | Lim ............................ 700/22 |
| 2008/0205419 A1* | 8/2008 | Shin et al. ................... 370/401 |

FOREIGN PATENT DOCUMENTS

| | | |
|---|---|---|
| KR | 10-2002-0054941 | 7/2002 |
| KR | 20040079474 | 9/2004 |
| KR | 1020040079474 | 9/2004 |
| KR | 10-2005-0000823 | 1/2005 |
| KR | 10-2005-0034409 | 4/2005 |
| KR | 1020050070217 | 7/2005 |
| KR | 10-2005-0086182 | 8/2005 |

OTHER PUBLICATIONS

Mozar, S., "Intelligent Standby Concept." Feb. 2000. *IEEE Transactions on Consumer Electronics*, vol. 46, No. 1, pp. 179-182.

* cited by examiner

HOME SERVER CAPABLE OF IMPLEMENTING ENERGY-SAVING AND SERVICE CONVERGENCE AND METHOD FOR CONTROLLING THE SAME

RELATED APPLICATION

The present application is based on, and claims priority from, Korean Application Number 2005-119125, filed Dec. 7, 2005, and Korean Application Number 2006-14833, filed Feb. 15, 2006, the disclosure of which is incorporated by reference herein in its entirety.

BACKGROUND OF THE INVENTION

1. Field of the Invention

The present invention relates to a home server and a method for controlling the same, and more particularly to a home server for providing not only broadcast services, Internet services, and game services, but also a broadband network distribution function requisite for a home network, and at the same time minimizing a used amount of a power-supply voltage, such that it implements service convergence and energy-saving, and a method for controlling the same.

2. Description of the Related Art

Generally, most homes or households include Personal Computers (PCs). The PCs can allow users to surf the Internet on the Web, and can reproduce or store various multimedia data, such that the number of functions capable of being executed by the PCs is rapidly increasing. Particularly, the higher the number of users who enjoy surfing the Internet, the higher the number of households, each of which owns at least two PCs.

Therefore, there is needed a home network capable of converging not only PCs, household appliances, controllers, and other devices located at each home or household, but also mobile phones and PDAs carried by users using a variety of wired/wireless technologies, and implementing home automation and home security.

In order to implement the above-mentioned home network, a home server capable of serving as a media server, a network server, and a home-automation server is required.

The above-mentioned home server acts as a PC capable of serving as a variety of servers for use in a variety of devices installed in each home, for example, a media server, a network server, and a home-automation server, etc.

The home server can basically store or re-distribute external content data received in each home over a broadcast network, a telephone network, or the Internet, can be used as a storage unit for storing digital video data or music data, or can serve as a PC's external storage unit. In addition, the home server can also serve as an information control center for each home.

Recently, with the increasing development of digital broadcast technology, the home server is currently extending from a conventional server function for use in a network such as the Internet to a digital broadcast device function capable of receiving/distributing digital broadcast data.

The home server equipped with the above-mentioned functions must be always powered on to perform distribution of a home network required to be always powered on. A conventional home server is unable to control power-supply units for each function, such that modules capable of performing other unused functions (e.g., an Internet service function, a game platform function, and a broadcast service function, etc.) are continuously powered on, resulting in the occurrence of increased power consumption.

Conventionally, the home server does not include an independent network processor for use in the network distribution function. Therefore, if a home network distribution function is additionally required on the condition that the broadcast service, the game service, and the Internet service have been provided to users, the above-mentioned conventional home server cannot provide the users with sufficient traffic volume for the home network distribution.

SUMMARY OF THE INVENTION

Therefore, the present invention has been made in view of the above problems, and it is an object of the present invention to provide a home server for providing not only broadcast services, Internet services, and game services, but also a broadband network distribution function requisite for a home network, and at the same time minimizing a used amount of a power-supply voltage, such that it implements service convergence and energy-saving, and a method for controlling the same.

In accordance with one aspect of the present invention, the above and other objects can be accomplished by the provision of a home server for implementing service convergence and energy-saving comprising: a broadcast processor for selectively receiving at least one broadcast signal, decoding the received broadcast signal, and distributing the received broadcast signal; a service processor for providing/processing a broadcast service, a game platform (i.e., a game service), and an Internet service, controlling overall operations of the home server, and reporting a current service mode and a current energy-saving mode to a power-supply controller; a network distribution unit for supporting a home private network, performing home network distribution, and transmitting a broadcast selection signal for distributing the broadcast signal to the power-supply controller; a power-supply unit for providing a power-supply signal to each module of the home server; and a power-supply controller for controlling on/off operations of the power-supply signal transmitted from the power-supply unit to each module of the home server according to services and operation states of the service processor and the network distribution unit.

In accordance with another aspect of the present invention, there is provided a method for controlling a home server capable of performing service convergence and energy-saving, wherein the home server includes: a broadcast receiver including a plurality of tuners and a decoder, for receiving/decoding a broadcast signal using the plurality of tuners and the decoder; a service processor for controlling/performing services received via the home server; and a network distribution unit for performing distribution of traffic data between home network devices or performing distribution of traffic data between a home network device and an out-home network device, such that it distributes a broadcast service, an Internet service, and a game service to the home network devices, and performs a network distribution function associated with the home network devices, the method comprising the steps of: a) if a first power-supply acting as a master power switch is switched on by a user, providing the network distribution unit with a power-supply signal; b) if the network distribution unit receiving the power-supply signal performs the network distribution function, and at the same time receives a broadcast distribution request from the home network devices, allowing the broadcast processor to select a tuner to be operated; and c) transmitting the power-supply signal to a tuner selected by the broadcast processor and a distribution module contained in the broadcast processor, and performing requested broadcast distribution.

Therefore, the home server according to the present invention provides an additional network distribution unit, such that it can distribute a broadcast service, an Internet service, and a broadband home network of at least 100 Mbps, can perform a broadcast set-top process including a terrestrial set-top function and an IP set-top function, and can provide a user with a variety of services such as game platform services.

In addition, the home server can control a power-supply signal for each module according to operations or service states of the home server, resulting in reduction of power consumption requisite for the home server.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 1:
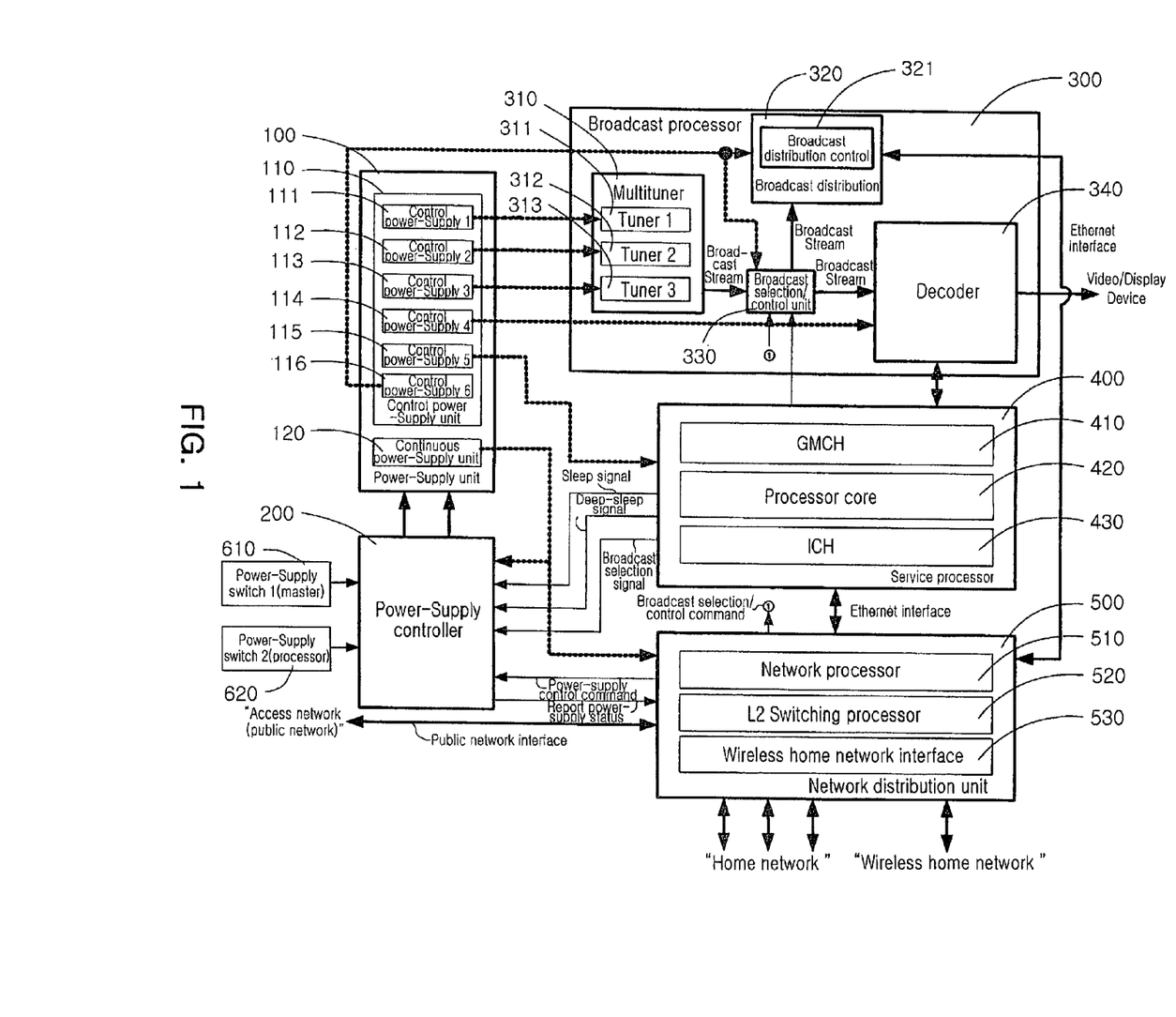
FIG. 1 is a block diagram illustrating a home server according to the present invention.

FIG. 1 is a block diagram illustrating a home server according to the present invention.

Referring to FIG. 1, the home server includes a power-supply unit 100, a power-supply controller 200, a broadcast processor 300, a service processor 400, and a network distribution unit 500.

The power-supply unit 100 provides modules of the home server with a power-supply signal or voltage. The power-supply controller 200 controls on/off operations of the power-supply signal transmitted from the power-supply unit 100 to the individual modules of the home server according to service modes or operation states of the home server.

The broadcast processor 300 selectively receives the power-supply signal from the power-supply unit 100 according to a control signal of the power-supply controller 200, receives at least one broadcast signal from the power-supply controller 200, decodes the received broadcast signal, and at the same time distributes the received broadcast signal.

The service processor 400 selectively receives the power-supply signal from the power-supply unit 100 according to a control signal of the power-supply controller 200, provides/processes the broadcast service, the game platform, and the Internet service using the received power-supply signal, and controls overall operations of the home server.

The network distribution unit 500 receives the power-supply signal from the power-supply unit 100 during the operation of the home server, supports a home private network using the received power-supply signal, and performs a home network distribution function.

In more detail, the broadcast processor 300 includes a multi-tuner unit 310, a broadcast distribution unit 320, a broadcast selection/control unit 330, and a decoder 340.

The multi-tuner unit 310 includes a plurality of tuners 311, 312, and 313 for converting/demodulating a frequency of a predetermined broadcast signal to output broadcast stream signals, such that it can simultaneously process at least one broadcast stream signal.

The broadcast distribution unit 320 converts the broadcast stream received from the multi-tuner 310 into IP packets to implement a multi-room broadcast service, such that it distributes the IP packets to a plurality of rooms.

The broadcast selection/control unit 330 selectively outputs a requested signal from among the broadcast stream signals generated from the multi-tuner unit 310, and controls a broadcast process of the requested signal.

The decoder 340 decodes the broadcast stream signals selectively received from the broadcast selection/control unit 330, and outputs a video signal according to the decoded broadcast stream signals. The video signal generated from the decoder 340 is transferred to video- or display-devices for each home.

The service processor 400 includes a GMCH (Graphics and Memory Controller Hub) element 410, an X86-based processor core 420, and an ICH (I/O Controller Hub) element 430.

The GMCH element 410 interfaces data with graphic- and memory-elements of the X86-based processor core 420, such that it can provide a user with a necessary service. The X86-based processor core 420 controls broadcast services, Internet service, and game services provided to the user. The ICH element 430 performs I/O interface with the processor core 420 and other peripheral devices.

The network distribution unit 500 includes a network processor 510, a L2 switching processor 520, and a wireless home network interface 530.

The network processor 510 controls a network distribution function between an out-home network and an in-home network (i.e., home network), and controls the other network distribution function between at least two home networks.

Upon receiving a control signal from the network processor 510, the L2 switching processor 520 performs the L2 switching among an external access network, a home network, and modules of a home server.

The wireless home network interface 530 allows the network processor 510 to communicate with wireless home devices.

In addition, the power-supply unit 100 includes a control power-supply unit 110 and a continuous power-supply unit 120.

Upon receiving a control signal for controlling a power-supply signal for each module, the control power-supply unit 110 includes a first control power-supply part 111 for providing a first tuner 311 contained in the multi-tuner 310 with the power-supply signal, a second control power-supply part 112 for providing a second tuner 312 of the multi-tuner 310 with the power-supply signal, and a third control power-supply part 113 for providing a third tuner 313 with the power-supply signal.

The control power-supply unit 110 includes a fourth control power-supply part 114 for providing the decoder 340 of the broadcast processor 300 with the power-supply signal according to a control signal.

The control power-supply unit 110 includes a fifth control power-supply part 115 for providing the service processor 400 with the power-supply signal according to a control signal.

The control power-supply unit 110 includes a sixth control power-supply part 116 for providing the power-supply signal to the broadcast distribution unit 320 and the broadcast selection/control unit 330 according to a control signal.

Therefore, the control power-supply unit 110 can provide individual modules with different power-supply voltages according to a control signal of the power-supply controller 200.

The continuous power-supply unit 120 always transmits the power-supply signal to the power-supply controller 200 and the network distribution unit 500.

In addition, the home server according to the present invention serves as a power-supply switch for powering on/off the power-supply signal of the home server by a user, and includes a first power-supply switch 610 acting as a master switch and a second power-supply switch 620 for use in a processor.

The network distribution unit 500 is connected to the external access network and the home network at the same time, such that it transmits traffic data from the access network to the home network or from the home network to the access network. The network distribution unit 500 is connected to the service processor 400 and the broadcast distribution unit 320 via an Ethernet interface.

The service processor 400 transmits a broadcast selection signal to the broadcast selection/control unit 330, such that it provides a user with broadcast services. The service processor 400 transmits a sleep signal, a deep-sleep signal, and the broadcast selection signal to the power-supply unit 200 according to service modes and operation states. The service processor 400 is connected to the decoder 340 via a PCI bus interface to control the decoder 340, such that a variety of operations of the decoder 340 are controlled, for example, IP-format graphic data control function and a decoder-chip initiation function, etc.

Figure 2:
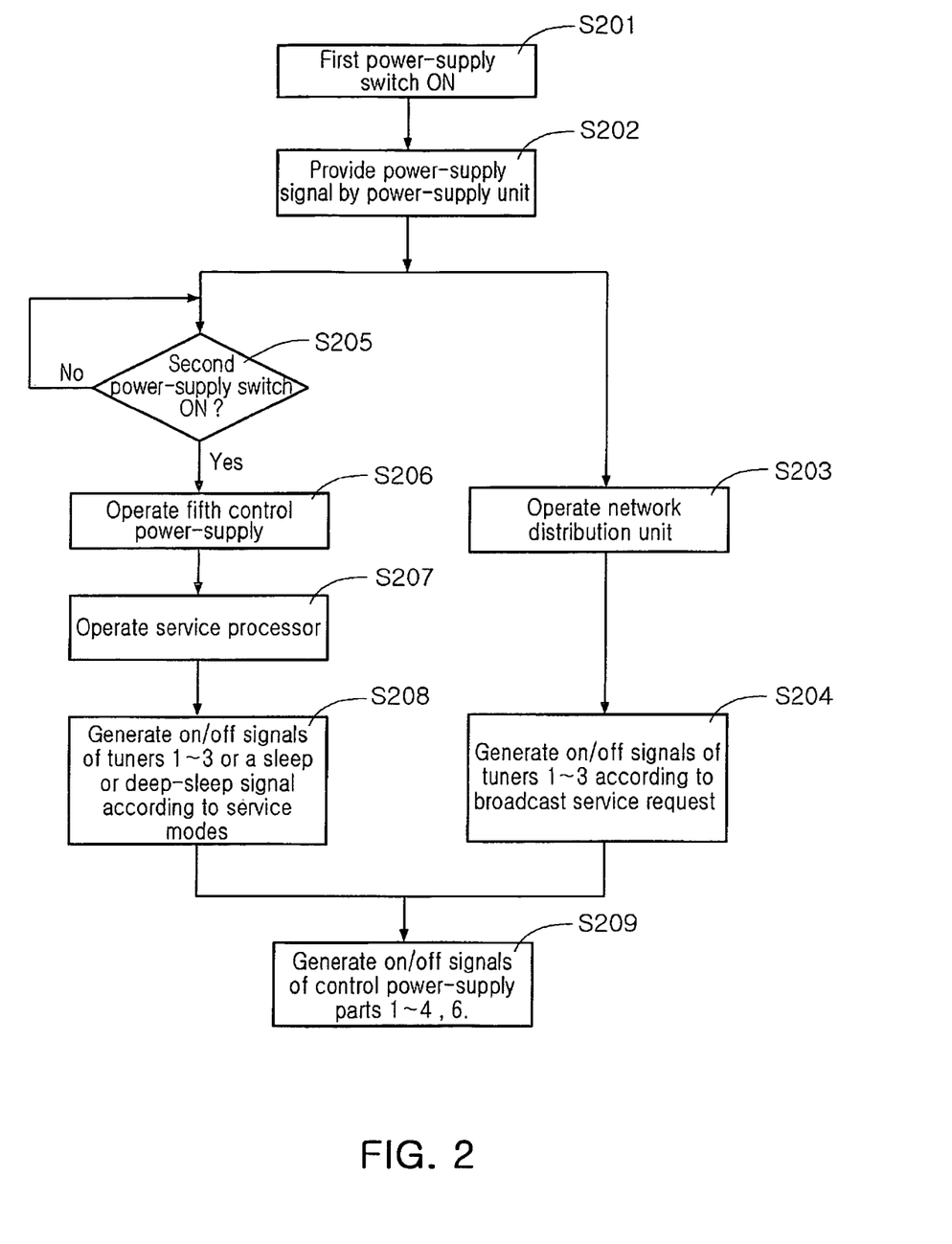
FIG. 2 is a flow chart illustrating a power-supply control process for use in the home server according to the present invention.

FIG. 2 is a flow chart illustrating a power-supply control process for use in the home server according to the present invention.

Referring to FIG. 2, in the case of the home server according to the present invention, if the first power-supply switch 610 acting as the master power-supply switch is switched on by a user at step S201, the power-supply controller 200 powers on the continuous power-supply unit 120 of the power-supply unit 100, such that it transmits a power-supply signal to the network distribution unit 500 required to be always powered on at step S202.

Therefore, the network distribution unit 400 is enabled by the power-supply signal, such that it performs network distribution and broadcast service distribution.

In this case, if the network distribution unit 500 receives a broadcast service request from each room under the multi-room service environment, a network processor 510 contained in the network distribution unit 500 transmits a command signal for powering on the sixth power-supply part 116 to the power-supply unit 200, such that it operates the broadcast distribution unit 320 and the broadcast selection/control unit 330. As a result, upon receipt of the service request, the broadcast distribution unit 320 and the broadcast selection/control unit 330 perform broadcast signal distribution and network distribution.

Also, if the network distribution unit 500 receives a broadcast selection/distribution request signal created by the broadcast service request signal under the multi-room service environment, it transmits on/off signals for each tuner 311, 312, or 313 of the multi-tuner 310 to the power-supply controller 200 according to the broadcast selection signal at step S204.

The power-supply controller 200 receives the on/off signals of each tuner 311, 312, or 313 from the network distribution unit 500, and controls the power-supply signal to selectively switch on or off each tuner 311, 312, or 313 according to an operation mode.

For example, if the power-supply controller 200 receives the ON signal for switching on the first tuner 311, it switches on the first control power-supply part 111, such that it provides the first tuner 311 with the power-supply signal at step S209. If the power-supply controller 200 receives the ON signal for switching on the second tuner 312, it switches on the second control power-supply part 112, such that it provides the second tuner 312 with the power-supply signal at step S209. If the power-supply controller 200 receives the ON signal for switching on the third tuner 313, it switches on the third control power-supply part 113, such that it provides the third tuner 313 with the power-supply signal at step S209.

Under the above-mentioned situation, only the first power-supply switch 610 is switched on, and the second power-supply switch 20 is not switched on yet. Therefore, under the above-mentioned situation, the network distribution unit 500 and/or the broadcast distribution unit 320 are/is operated only, and the service processor 400 is not operated.

Accordingly, if a user desires to employ other services (e.g., game- or Internet-services) other than the above-mentioned network distribution function, the second power-supply switch 620 must be switched on by the user.

After the first power-supply switch 610 has been switched on at step S201, the power-supply controller 200 determines whether the second power-supply switch 620 is switched on or off at step S205. In this case, if the second power-supply switch 620 is switched on at step S205, the power-supply controller 200 powers on the fifth control power-supply part 115 of the power-supply unit 100, such that it transmits the power-supply signal to the service processor 400 at step S206.

Therefore, upon receiving the power-supply signal from the power-supply controller 200, the service processor 400 is enabled, such that it controls a variety of operations required for broadcast services, game platform services, and Internet services.

In this case, the service processor 400 generates a broadcast selection signal according to service categories, and at the same time transmits on/off signals of the tuners 311~313 contained in the multi-tuner 310 to the power-supply controller 200 according to the broadcast selection signal.

If an energy-saving mode or power-saving mode is pre-established, the service processor 400 controls the home server under the energy-saving mode or the power-saving mode according to a power management program pre-stored in the service processor 400 itself, such that it transmits a sleep signal or deep-sleep signal indicating the above-mentioned energy-saving or power-saving mode to the power-supply controller 200 at step S208.

Therefore, if the service processor 400 begins its operation, the power-supply controller 200 transmits on/off signals of the control power-supply parts 111~114 to the power-supply unit 100 according to a service mode or energy-saving mode of the service processor 400 at step S209.

In more detail, the power-supply controller 200 powers on only one of the tuners 311~313, or controls a power-supply signal for use in the decoder 340 at step S209.

As described above, the home server according to the present invention recognizes individual operation states, transmits the power-supply signal to only modules required for operations corresponding to the recognized operation state, and does not transmit the power-supply signal to the remaining modules other than the aforementioned required modules, such that it can minimize the amount of standby power consumed for the home server, resulting in reduction of overall power consumption.

In the meantime, if the power-supply signal is controlled according to individual modules as described above, a decoder drive for the decoder 340 must be re-driven when the power-supply signal is re-transmitted to the decoder 340.

The decoder drive is contained in the memory of the service processor 400, such that it is driven when the service processor 400 is operated. There is needed a specific process capable of normally operating the decoder 340 even if the service processor 400 is not operated by power-supply control signals of individual modules. A detailed description of the above-mentioned specific process will hereinafter be described in detail.

Figure 3:
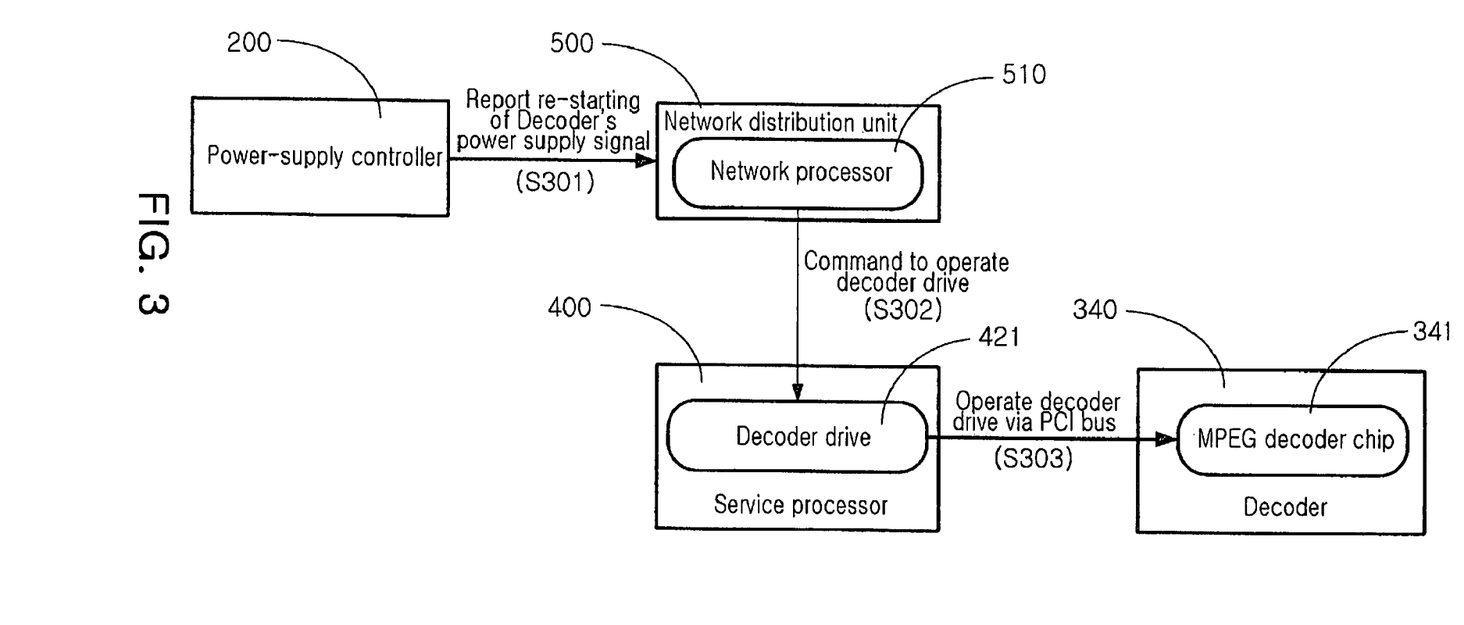
FIG. 3 is a flow chart illustrating a signal process for re-driving a decoder of the home server according to the present invention.

FIG. 3 is a flow chart illustrating a signal process for re-driving a decoder of the home server according to the present invention.

Referring to FIG. 3, if the fourth control power-supply part 114 is switched on to provide the decoder 340 with the power-supply signal, the power-supply controller 200 reports re-starting of the decoder 340 to the network processor 510 of the network distribution unit 500 at step S301.

Upon receipt of the re-starting message of the decoder 340, the network processor 510 re-drives the MPEG decoder chip 341 of the decoder 340 via a PCI bus using a specific program (i.e., a decoder drive 421) stored in the memory of the service processor 400 at step S303. As a result, the decoder 340 equipped with the above-mentioned drive is normally operated.

Figure 4:
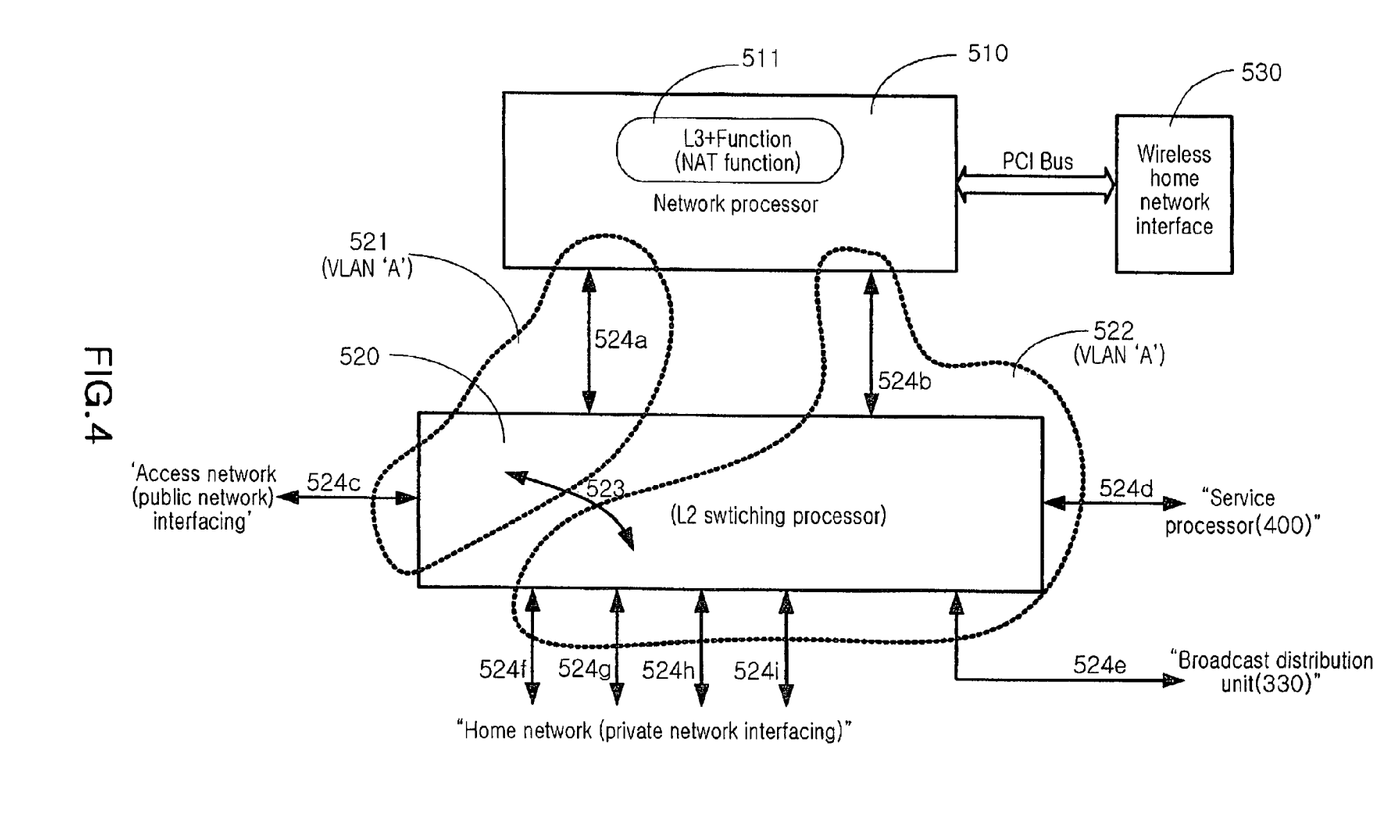
FIG. 4 is a detailed block diagram illustrating a network distribution unit for use in the home server according to the present invention.

FIG. 4 is a detailed block diagram illustrating a network distribution unit for use in the home server according to the present invention.

Referring to FIG. 4, the network distribution unit 500 connects two Ethernet ports 524a and 524b of the L2 switching processor 520 to the network processor 510 via the Ethernet interface. The network distribution unit 500 selects only one Ethernet port from among the Ethernet ports of the L2 switching processor 520, and uses the selected Ethernet port as an access network interface port (also called a public network interface port) 524c.

The network distribution unit 500 selects two Ethernet ports, and uses the selected Ethernet ports as interface ports 524d and 524e, such that the interface port 524d is connected to the service processor 400, and the other interface port 524e is connected to the broadcast distribution unit 330 via the interface ports 524d and 524e, respectively. The network distribution unit 500 uses the remaining Ethernet ports 524f~524i other than the aforementioned Ethernet ports 524a~524e as home network interfaces to implement a home private network interfacing function.

In addition, the L2 switching processor 520 independently uses a first VLAN (Virtual Local Area Network) "A" 521 for use in the access network and a second VLAN "B" 522 for use in the home network using a port-based VLAN scheme.

Due to the above-mentioned construction, all network traffic data received from the access network is transmitted to the network processor 510 via the Ethernet port 524a of the first VLAN "A".

The traffic data is transmitted to the Ethernet port 524b according to a L3+ function of the network processor 510, and is then transmitted to the second VLAN "B" 522 and the home network ports 524f~524i. Otherwise, the traffic data is transmitted to a destination for each home via a wireless home network interface 530 via the PCI bus.

On the other hand, other traffic data transmitted from the home network to the external access network is transmitted to a destination of the external access network in the direction opposite to that of the aforementioned traffic data transmitted from the access network to the home network.

Differently from the above-mentioned traffic path, the L2 multicast MAC table based on the IGMP snooping is controlled, such that priority for crossing the first VLAN "A" 521 and the second VLAN "B" 522 is assigned to IP multicast traffic data for an IP-TV service, resulting in reduction of packet processing load of the network processor 510.

If a gigabit Ethernet port of at least 100 Mbps is used as the access network interface port 524c according to the reduced packet process load, processing capacity of overall network distribution function is higher than 100 Mbps due to the network distribution unit 500.

In other words, in association with the IP multicast traffic data, the L2 multicast MAC table based on the IGMP snooping is controlled, such that the network distribution unit 500 directly performs the switching among the access network interface port 524c, the home network ports 524f~524i, the interface port 524d for connecting the L2 switching processor 522 to the service processor 400, and the interface port 524e for connecting the L2 switching processor 522 to the broadcast distribution unit 320, resulting in reduction of packet process load of the network processor 510.

As apparent from the above description, the home server according to the present invention additionally provides a network distribution unit, such that it can perform distribution of a broadband home network of at least 100 Mbps. Also, the home server can control a power-supply signal for each module according to operations or service states of the home server, resulting in reduction of power consumption requisite for the home server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home server for implementing service convergence and energy-saving comprising:

a broadcast processor for selectively receiving at least one broadcast signal, decoding the received broadcast signal, and distributing the received broadcast signal, wherein the broadcast processor includes a multi-tuner unit equipped with a plurality of tuners, for converting/demodulating a frequency of the broadcast signal;

a service processor for providing/processing a broadcast service, a game service, and an Internet service, controlling overall operations of the home server, and reporting a current service mode and a current energy-saving mode to a power-supply controller;

a network distribution unit for supporting a home private network, performing home network distribution, and transmitting a broadcast selection signal for distributing the broadcast signal to the power-supply controller;

a power-supply unit for providing a power-supply signal to each module of the home server; and a power-supply controller for controlling on/off operations of the power-supply signal transmitted from the power-supply unit to the each module of the home server according to services and operation states of the service processor and the network distribution unit, wherein the service processor transmits a multi-tuner selection signal according to the selected broadcast signal to the power-supply controller, and the network processor contained in the network distribution unit transmits a multi-tuner selection signal to the power-supply controller according to a broadcast selection/distribution request signal, wherein the power-supply unit includes: a first control power-supply part for selectively transmitting the power-supply signal to the decoder of the broadcast processor; a second control power-supply part for selectively transmitting the power-supply signal to the service processor; and a plurality of control power-supply parts other than the first and second control power-supply parts, for selectively transmitting the power-supply signal to each tuner of the multi-tuner unit contained in the broadcast processor in according to the multi-tuner selection signals transmitted from the service processor and the network processor.

2. The home server according to claim 1, wherein the broadcast processor includes: a broadcast distribution unit for distributing the broadcast stream signal received from the multi-tuner; a broadcast selection/control unit for selectively outputting a request signal from among the broadcast stream signal received from the multi-tuner, and controlling a broadcast process of the requested signal; and a decoder for decoding the broadcast stream signal selected by the broadcast selection/control unit, and outputting a video signal using the decoded broadcast stream signal.

3. The home server according to claim 2, wherein the power-supply unit includes:
a control power-supply unit for transmitting the power-supply signal to each module of the service processor and the broadcast processor according to a control signal; and
a continuous power-supply unit for continuously transmitting the power-supply signal to the network processor and the power-supply controller.

4. The home server according to claim 3, wherein the continuous power-supply unit continuously transmits the power-supply signal to the broadcast distribution unit and the broadcast selection/control unit from among the modules of the broadcast processor.

5. The home server according to claim 2, wherein the service processor transmits an energy-saving mode signal to the power-supply controller according to operations of an energy-saving management program.

6. The home server according to claim 2, wherein:
if the power-supply signal is re-provided to the decoder, the power-supply controller reports re-starting of the decoder to the network processor; and
if the re-staring of the decoder is reported to the network processor, the network processor operates the decoder drive using a decoder drive program stored in the service processor.

7. The home server according to claim 1, wherein the service, processor includes:
a processor core for controlling provision- or convergence-operations of the broadcast service, the Internet service, and the game service;
a GMCH (Graphics and Memory Controller Hub) element for interfacing data with graphic- and memory-elements of the processor core; and
an ICH (I/O Controller Hub) element for performing an I/O (Input/Output) interface with peripheral devices of the processor core.

8. The home server according to claim 1, wherein the network distribution unit includes:
a network processor for controlling a network distribution function between an out-home network and an in-home network (i.e., home network), and controlling the other network distribution function between at least two home networks (i.e., at least two in-home networks);
L2 switching processor for receiving a control signal from the network processor, performing switching of traffic data between the out-home network and the home network, and performing switching of traffic data between the home networks, and performing switching between the modules of the home server; and
a wireless home network interface for allowing the network processor to communicate with wireless home devices.

9. The home server according to claim 8, wherein:
the L2 switching processor selects first and second Ethernet ports, and connects the first and second Ethernet ports to the network processor,
the L2 switching processor selects a third Ethernet port, and connects the third Ethernet port to an external access network (i.e., a public network),
the L2 switching processor selects fourth and fifth Ethernet ports, connects the fourth Ethernet port to the service processor, and connects the fifth Ethernet port to a broadcast distribution unit, and
the L2 switching processor uses the remaining Ethernet ports other than the first to fifth Ethernet ports as home private network interfaces.

10. The home server according to claim 9, wherein the L2 switching processor includes:
a first VLAN (Virtual Local Area Network) for connecting the access network to the network process using a port-based VLAN scheme; and
a second VLAN (Virtual Local Area Network) for connecting the network processor to the home network.

11. The home server according to claim 10, wherein:
the network processor receives all network traffic data from the access network via the first VLAN of the L2 switching processor, transmits the received network traffic data to a destination contained in the home network via either the second VLAN of the L2 switching processor or a wireless home network interface, and
the network processor receives other traffic data from the home network to the external access network via either the wireless home network interface or the second VLAN of the L2 switching processor, and transmits the received traffic data to the access network via the first VLAN of the L2 switching processor.

12. The home server according to claim 10, wherein:
the network distribution unit controls a L2 multicast MAC table based on an IGMP snooping in association with IP multicast traffic data for an IP-TV service, assigns priority to the IP multicast traffic data as compared to the first and second VLANs, and processes the resultant data.

13. The home server according to claim 1, wherein the network distribution unit is connected to each of the service processor and a broadcast distribution unit via an Ethernet interface.

14. The home server according to claim 1, further comprising:
a first power-supply switch for enabling the network distribution function; and
a second power-supply switch for operating the service processor capable of employing the services.

15. The home server according to claim 14, wherein:

upon receiving an ON signal from the first power-supply switch, the power-supply controller controls the power-supply unit, such that the power-supply signal is applied to the network processor and the broadcast distribution unit contained in the broadcast processor; and upon receiving an ON signal from the second power-supply switch, the power-supply controller controls the power-supply unit, such that the power-supply signal is applied to the service processor.

16. A method for controlling a home server capable of performing service convergence and energy-saving, wherein the home server includes: a broadcast processor including a plurality of tuners and a decoder, for receiving/decoding a broadcast signal using the plurality of tuners and the decoder; a service processor for controlling/performing services received via the home server; and a network distribution unit for performing distribution of traffic data between home network devices or performing distribution of traffic data between a home network device and an out-home network device, such that the network distribution unit distributes a broadcast service, an Internet service, and a game service to the home network devices, and performs a network distribution function associated with the home network devices, the method comprising the steps of:

a) if a first power-supply switch acting as a master power-supply switch is switched on by a user, powering on, by a power-supply controller, a continuous power-supply unit of a power-supply unit, such that the continuous power-supply unit provides the network distribution unit required to be always powered on with a power-supply signal;

b) if the network distribution unit receiving the power-supply signal performs the network distribution function, and at the same time receives a broadcast distribution request from the home network devices, allowing the broadcast processor to select one of the tuners to be operating;

c) transmitting the power-supply signal to the tuner selected by the broadcast processor and a distribution module contained in the broadcast processor, and performing the requested broadcast distribution;

d) if a second power-supply switch acting as power-supply switch of the service processor is switched on, transmitting the power-supply signal to the service processor;

e) allowing the service processor receiving the power-supply signal to perform a requested service, and selecting one of the tuners to be operated by the broadcast processor according to a service mode, wherein the service processor provides broadcast service, game service, and an Internet service, controls overall operations of the home server, and reports the service mode and currently energy-saving mode to the power-supply controller; and f) transmitting the power-supply signal to the tuner to operate the tuner selected by the service processor.

17. The method according to claim 16, further comprising the steps of:

g) allowing the service processor receiving the power-supply signal to perform an energy-saving program, and generating an energy-saving signal indicative of an energy-saving mode; and h) controlling the power-supply signals of the tuners and the decoder contained in the home server, other than the network distribution unit, according to the energy-saving mode signal.

18. The method according to claim 17, further comprising the steps of:

i) determining whether the power-supply signal is re-applied to the decoder of the broadcast processor; and j) if the power-supply signal is re-applied to the decoder, allowing a network processor of the network distribution unit to re-operate the decoder receiving the power-supply signal by referring to a decoder drive contained in an internal memory of the service processor.

\* \* \* \* \*